United States Patent [19]

Herrmann et al.

[11] Patent Number: 4,973,239
[45] Date of Patent: Nov. 27, 1990

[54] APPARATUS FOR THE EXTRACTION OF MELT SAMPLES FROM A MATERIAL WHICH IS LIQUID AT AN ELEVATED TEMPERATURE, BUT SOLID AT AMBIENT TEMPERATURE

[75] Inventors: Heinz Herrmann, Stuttgart; Albert Grimminger, Leonberg, both of Fed. Rep. of Germany

[73] Assignee: Werner & Pfleiderer GmbH, Fed. Rep. of Germany

[21] Appl. No.: 376,240

[22] Filed: Jul. 6, 1989

[30] Foreign Application Priority Data

Aug. 1, 1988 [DE] Fed. Rep. of Germany ....... 3826095

[51] Int. Cl.$^5$ .............................................. B29C 45/40
[52] U.S. Cl. .................................... 425/135; 264/40.1; 264/328.1; 425/169; 425/382.4; 425/556; 425/560; 425/561; 425/564
[58] Field of Search ................ 425/556, 560, 561, 562, 425/382.3, 382.4, 557, 135, 564, 566, 169; 264/40.1, 328.1

[56] References Cited

U.S. PATENT DOCUMENTS

| | | | |
|---|---|---|---|
| 3,723,037 | 3/1973 | Formo | 425/561 |
| 3,975,128 | 8/1976 | Schluter | 425/561 |
| 4,099,904 | 7/1978 | Dawson | 425/562 |
| 4,255,368 | 3/1981 | Olabisi | 425/564 |
| 4,722,679 | 2/1988 | Farrell | 425/560 |

FOREIGN PATENT DOCUMENTS 884105 8/1953 Fed. Rep. of Germany .
2246672 9/1972 Fed. Rep. of Germany .

*Primary Examiner*—Richard L. Chiesa
*Assistant Examiner*—Khanh P. Nguyen
*Attorney, Agent, or Firm*—Laff, Whitesel, Conte & Saret

[57] ABSTRACT

An apparatus for the extraction of melt samples, particularly from continuously operating plastics processing plants, has a test sample mould which is connected to a melt channel via a transfer channel. There are provided a shutoff device and a device for transferring the melt into the mould. In the transfer channel there is arranged a suction piston which sucks the melt out of the melt channel into the transfer channel which in this case is opened simultaneously. In addition, there is provided a pressure piston for injecting this melt into the moulding chamber. An apparatus of particularly simple construction is created in this way and permits extraction of melt samples without the melt coming into contact with the atmosphere, no dead spaces at all being created at the same time in the melt channel during the time when no melt samples are extracted.

17 Claims, 4 Drawing Sheets

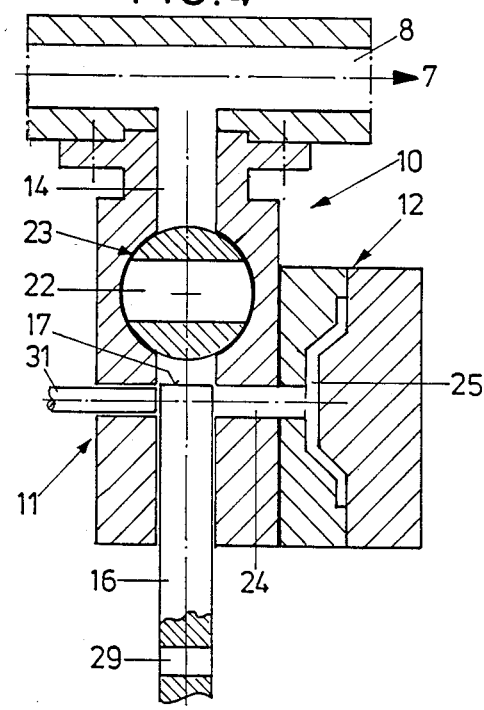
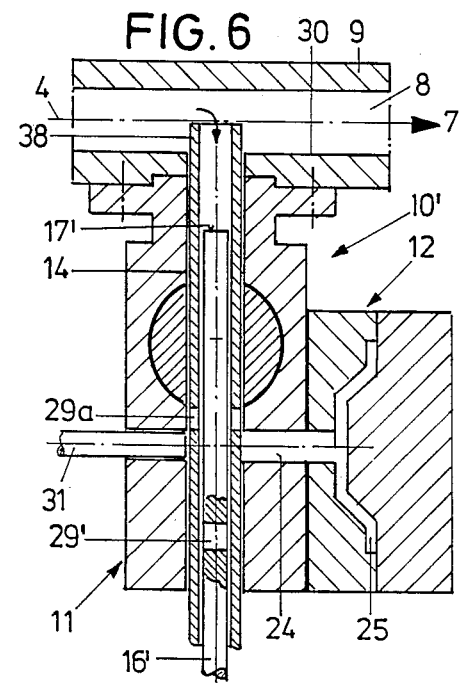
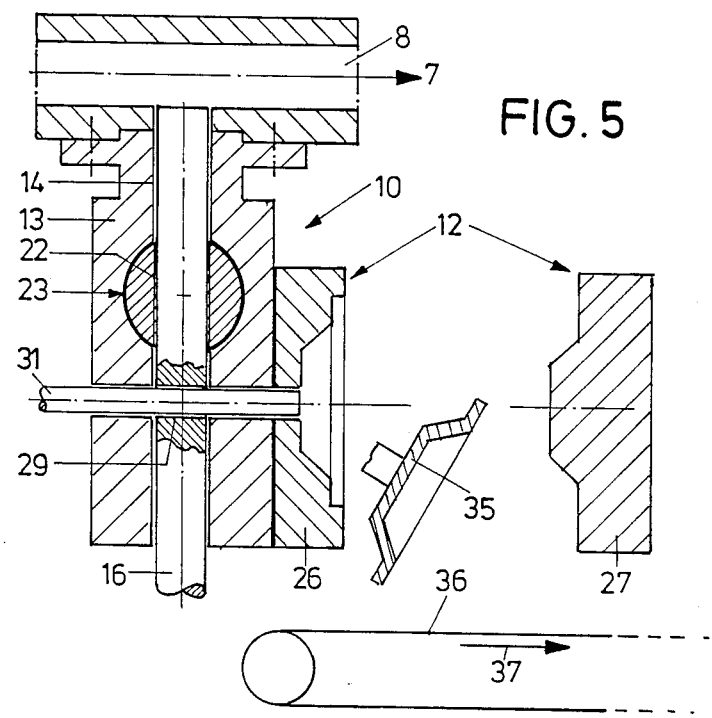

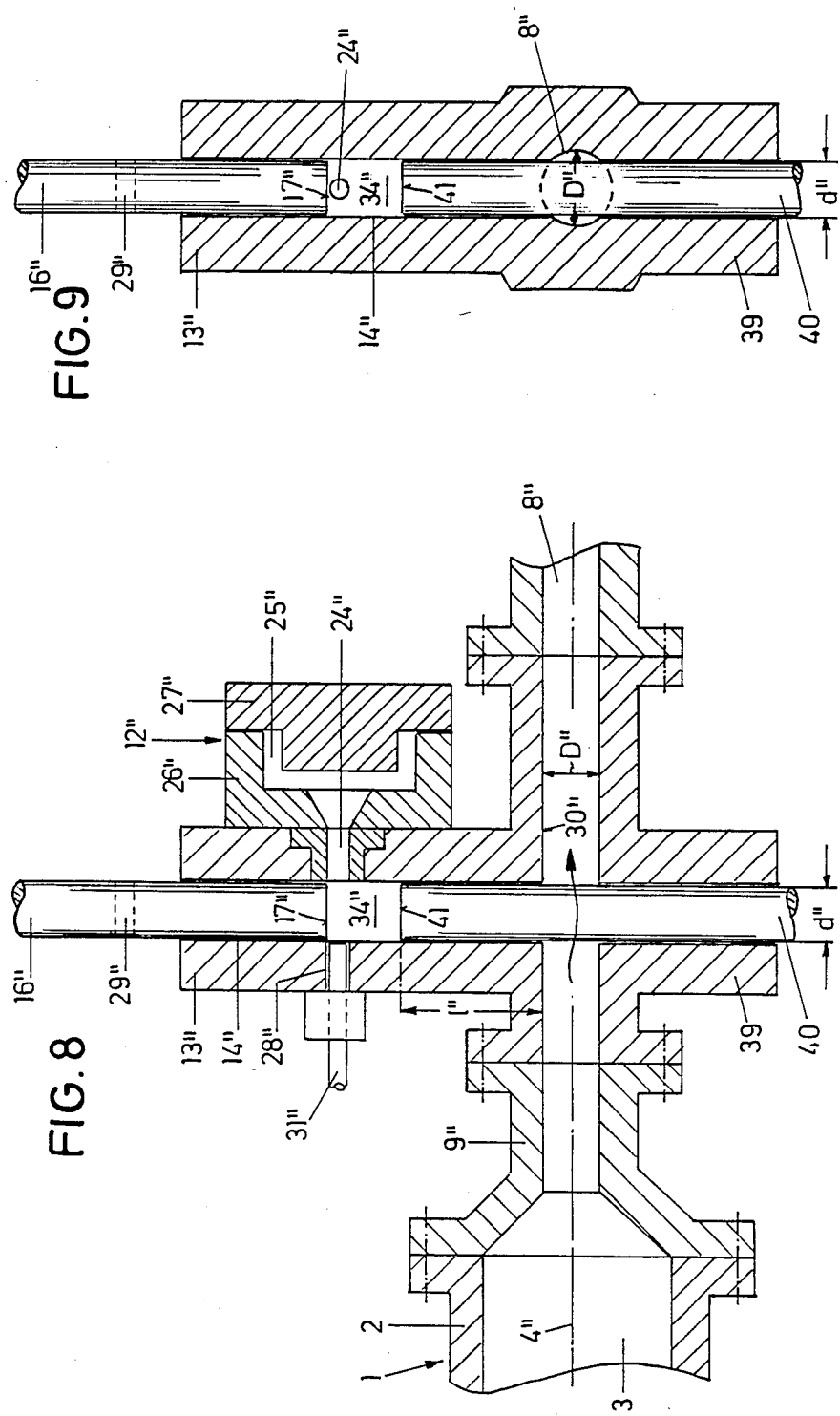

APPARATUS FOR THE EXTRACTION OF MELT SAMPLES FROM A MATERIAL WHICH IS LIQUID AT AN ELEVATED TEMPERATURE, BUT SOLID AT AMBIENT TEMPERATURE

FIELD OF THE INVENTION

The invention relates to an apparatus for the extraction of melt samples from a material which is liquid at an elevated temperature, but solid at ambient temperature, particularly from continuously operating plastics processing plants, comprising a test sample mould which is connected to a melt channel via a transfer channel, a device for transferring the melt from the melt channel into the test sample mould, and further disclosing a shut-off device for closing the transfer channel leading to the melt channel.

BACKGROUND OF THE INVENTION

With an apparatus of this type, which is known from German patent specification 22 46 672, a sample is extracted via a valve from a tank, a reactor or a pipe containing the melt. For this purpose the apparatus has a moulding chamber which is connected to the chamber for working the melt via a transfer channel, there being provided a shut-off device in the transfer channel. The moulding chamber contains a displacer by means of which a partial evacuation can take place firstly by drawing back the displacer, which partial evacuation enables the sample to run into the moulding chamber. After the sample has solidified, a wall of the moulding chamber is detached and the test sample is ejected by means of the displacer. With this known device the melt in the melt working chamber cannot be prevented from coming into contact with the atmosphere. Moreover, the apparatus is very costly. Finally, it has dead spaces to a high degree. For the reasons mentioned sampling can only be effected in each case with the known apparatus at long time intervals if the melt intended for further processing is not to be impaired in quality. With modern continuous methods for the preparation and processing of plastic materials, as are used particularly in compounding or extruding plants, a constant quality control would be desirable per se, that is in so-called real-time processing, i.e. a quality control with which the individual test samples can be associated quite precisely with the melt at a specific point of time. The manufacture of actual test samples is unalterable in many fields of application; naturally it permits only a discontinuous manufacture of test samples, that is also only an intermittent extraction of melt samples.

German patent specification 884 105 discloses an injection moulding process and an apparatus for manufacturing mouldings from thermoplastic materials, in which apparatus the discharge element of a twin screw screw-type machine is followed by a transfer channel, by which machine the melt can be pressed into a mould by means of a pressure piston which is displaceable in the channel, the transfer channel being filled directly by the pressure of the melt in the machine, the pressure piston closing the moulding nozzles when the melt is pressed out into the mould.

SUMMARY OF THE INVENTION

It is an object of the invention to provide an apparatus of the type as defined which, while being simple in construction, permits manufacture of test samples directly in the production plant without the melt in the melt channel being exposed in this case to the atmosphere.

This object is achieved according to the invention by the features that test sample mould is connected to the transfer channel via an injection channel, that there is arranged in the transfer channel a suction piston which is displaceable from a position for closing the transfer channel from the melt channel, while the melt is sucked into the transfer channel, into a position for not closing the injection channel, that with the aid of the shut-off device arranged in the area between the injection channel and melt channel, the transfer channel can be shut off from the melt channel in a position which does not close the injection channel, and that there is provided a pressure piston for injecting the melt into the test sample mould from an area of the transfer channel between the suction piston and the shut-off device. If no melt sample is taken, the suction piston then closes the melt channel leaving no dead space and creating a secure seal toward the atmosphere. If some of the melt which is extracted by suction is injected into the test sample mould by means of the pressure piston, the transfer channel is closed in the direction of the melt channel by the shut-off device; secure sealing from the atmosphere is also provided. If in turn the suction piston is moved back into its position for sealing off the transfer channel from the melt channel, the injection channel has already been closed in this case so that, even when the test sample mould is open, there can be no contact between the atmosphere and the melt channel. With this return action of the suction piston, melt which has not been injected into the test sample mould is forced back into the melt channel. If the shutoff device is formed by a valve which is rigidly associated with the transfer channel, it is particularly advantageous if the suction piston is at the same time also in the form of a pressure piston, i.e. if it is a suction/pressure piston which, when the shutoff device is closed, injects into the test sample mould some of the melt which has been sucked into the transfer channel.

If the shutoff device is formed by the pressure piston which can be introduced into the transfer channel from the melt channel, a pressure piston which is independent from the suction piston serves at the same time as the shutoff device.

If the suction piston can be moved into a position flush with an inner wall of the melt channel, this gives rise to a particularly distinctive design—free of dead space—of the apparatus with regard to the melt channel.

With the apparatus according to the invention the melt can be extracted intermittently particularly when used at the end of a screw-type machine between the end of the screw and a delivery element and formed into test samples directly on the machine, this being possible by compression or injection moulding. In principle, the apparatus according to the invention can be added on irrespective of the size of the machine.

Further advantages and features of the invention will become apparent from the ensuing description of three exemplary embodiments taken in conjunction with the drawings.

BRIEF DESCRIPTION OF THE DRAWINGS

FIGS. 1 to 5 show a diagrammatic view, in longitudinal section, of an apparatus according to the invention in five different working positions, FIG. 6 is a view, in longitudinal section, of an apparatus according to the invention which is slightly modified when compared with the exemplary embodiment according to FIGS. 1 to 5, FIGS. 7, 8 show a view, in longitudinal section, of a third embodiment of an apparatus according to the invention in different working positions, and FIG. 9 is a cross-section through the apparatus according to FIGS. 7, 8 along the section line IX—IX in FIG. 8.

DESCRIPTION OF THE PREFERRED EMBODIMENTS

Figure 1:
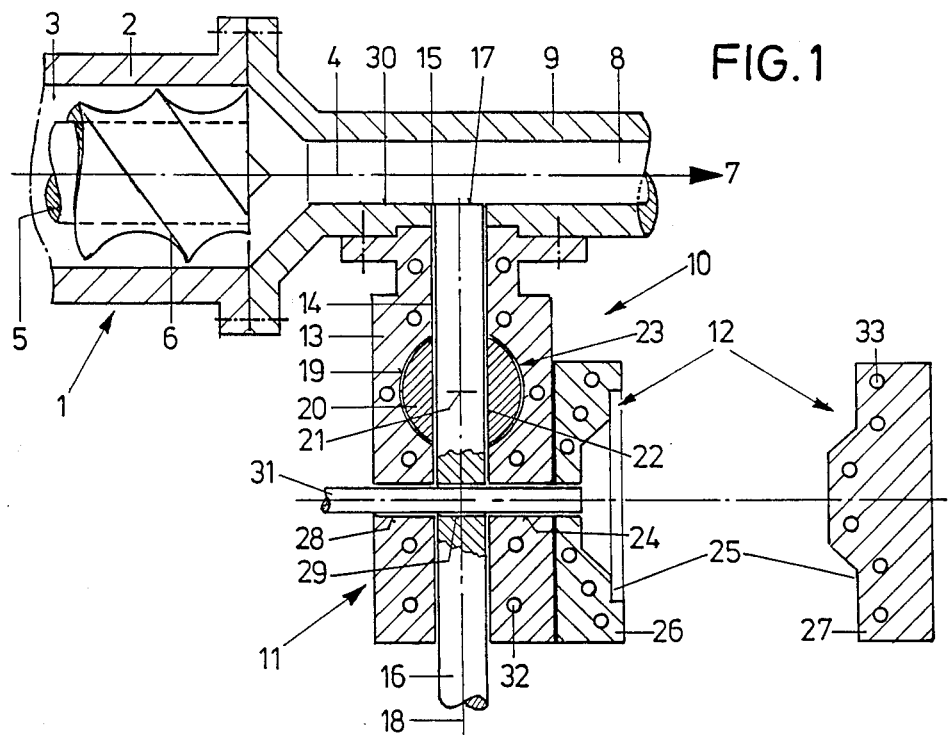

In the case of the first exemplary embodiment shown in FIGS. 1 to 5 the end of an extruder 1 on the outlet side is shown. In the barrel 2 there is formed at least one cylindrical treatment chamber 3 in which a screw shaft 5 is rotatably arranged concentrically with the longitudinal axis 4 of the barrel chamber 3, on which shaft there are arranged-in the present case two—screw turns 6 which, in preceding areas of the treatment chamber, convey material, particularly plastics material, which is treated by screw turns and, if necessary, by so-called kneading plates, i.e. mixed, homogenized and melted, in the conveying direction 7 out of the treatment chamber into a melt channel 8 through which the melt is fed to a moulding tool. The design of the extruder is of no importance as it is known. Also, the type of plastic moulding tools following after the melt channel 8 is of no significance.

The melt channel 8 is delimited by a pipe 9. An apparatus 10 for the extraction of the melt and manufacture of test samples therefrom is connected to the melt channel 8. The apparatus has a melt extractor 11 and, connected thereto, a test sample mould 12. The device 11 has an extraction housing 13 which is flange-mounted on the pipe 9 and has a cylindrical transfer channel adjacent to an extraction opening 15 of equal diameter in the pipe 9. In a transfer channel 14 which extends approximately at right angles to the longitudinal axis 4, there is arranged a suction and pressure piston 16, the cross-sectional area of which is guided in the transfer channel 14 so as to be play-free and leakproof, at least in the region of its piston area 17 facing the melt channel 8. The piston 16 is displaceable by motor or manually in the direction of its longitudinal axis 18. In a bore 19 running at right angles to the longitudinal axis 4 and longitudinal axis 18 in the extraction housing 13, an adapted cylindrical valve body 20 is arranged so as to be free from play, but rotatable about its longitudinal axis 21 which—as already mentioned—runs perpendicular to the other two longitudinal axes 4, 18. In the valve body 20 there is formed a valve bore 22 which is concentric with the longitudinal axis 18 and has the same diameter as the transfer channel 14 and which is in this respect therefore part of the transfer channel. The bore 19 therefore combines with the valve body 20 having the valve bore 22 to form a valve 23 for closing the transfer channel 14. On the side of the valve 23 lying opposite the melt channel 8 there is formed with the transfer channel 14 an injection channel 24 which is cylindrical and runs for example approximately parallel to the longitudinal axis 4 and which opens into a test sample moulding chamber 25 of the test sample mould 12. The mould 12 consists of two mould halves 26, 27, of which one mould half 26 is attached to the extraction housing 13 whilst the other mould half 27 can be lifted clear (FIGS. 1,5) of the mould half 26 in a known manner and by normal means to open the moulding chamber 25 or fitted (FIGS. 2 to 4) on to the mould half 26 to close the moulding space 25. In alignment with the cylindrical injection channel 24, there is formed an ejector guide channel 28 in that side of the extraction housing 13 remote from the mould 12, which guide channel is associated, also in alignment, with a guide bore 29 in the piston 16, which bore is then in alignment with the guide channel 28 and the injection channel 24 if the piston area 17 of the piston 16 is in alignment with the inner wall 30 of the pipe 9, that is if the piston 16 closes the transfer channel 14 leaving it clear of dead space. In the ejector guide channel 28 there is arranged a rod-shaped ejector 31, the cross-section of which is matched to the cross-section of the guide channel 28, the guide bore 29 and the injection channel 24. It can be driven manually or by a motor in its longitudinal direction.

Tempering devices 32, 33 which are independent of one another are formed in the extraction housing 13 and in the test sample mould 12, as indicated by the heating or cooling medium channels shown in the drawing.

Figure 2:
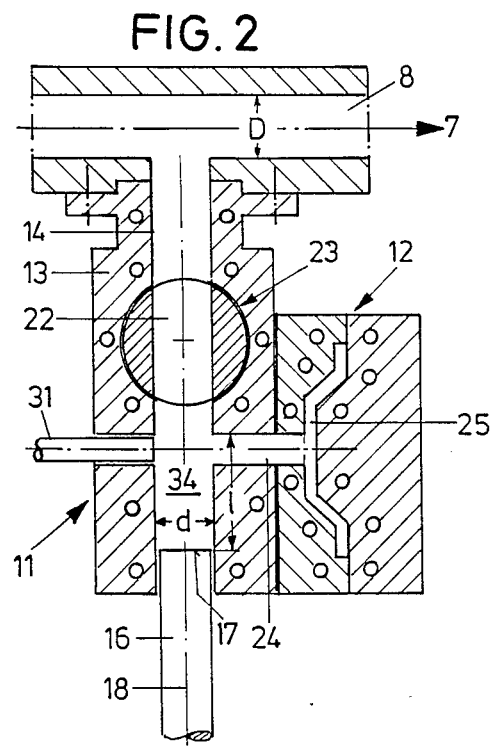
Figure 3:
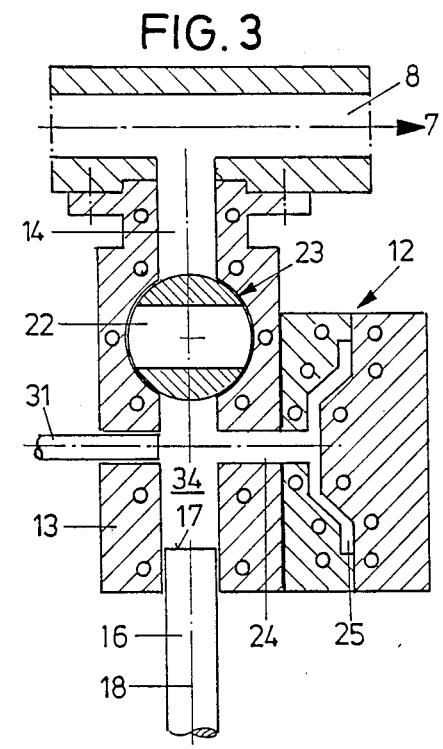

The mode of operation of the apparatus 10 is as follows:

The starting position is shown essentially in FIG. 1 when the melt is fed from the extruder 1 through the melt channel 8 in the conveying direction 7 to a mould. The transfer channel 14, including the extraction opening 15 in the pipe 19, are fully closed by the piston 16. The ejector 31 is still situated in its position pushed through as far as the test sample moulding chamber 25, in which position it locks the piston 16 simultaneously in its closed position. The test sample mould 12 can still be opened by a preceding test sample ejecting operation, as shown in FIG. 1, or can be already closed, as shown in FIG. 2. At the beginning of a melt extraction the ejector 31 is, as shown in the view in FIG. 2, moved into a retracted position in which it is neither situated in the injection channel 24 nor passes through the piston 16. Then the piston 16 is drawn away from the melt channel 8 so that the melt is sucked through the extraction opening 15 into the transfer channel 14, that is by a distance 1 over the injection channel 24. This length 1 is selected in such a manner that the volume of a suction chamber 34, which is determined by the length 1 and the diameter d of the transfer channel 14, is at least as great as the volume of the test sample moulding chamber 25 and the injection channel 24. Then the valve 23 is closed by the valve body 20 being rotated about its longitudinal axis 21 so that the valve bore 22 no longer communicates with the transfer channel 14, i.e. the latter is closed by the valve body 20, as shown in FIG. 3. Then the piston 16 is displaced again in the direction of the injection channel 24 whereby the melt situated in the suction chamber 34 is conveyed through the injection channel 24 into the test sample moulding chamber 25 of the closed test sample mould 12 and injected into the latter. At the end of this injection operation the piston 16 closes the injection channel 24 precisely, as shown in FIG. 4. Then the valve is opened again by corresponding rotation of the valve body 20 about its longitudinal axis 21 so that the piston 16 can be retracted again into its starting position. In this case it conveys the melt which is situated in the transfer channel between the injection channel 24 and melt channel 8 back again into the melt channel 8. At the same time the test sample 35 formed in the test sample moulding chamber 25 is cooled by appropriate actuation of the tempering device 33 so that it solidifies. Because the ejector guide channel 28, the guide bore 29 in the piston 16 and the injection channel 24 are in alignment when the piston 16 is in this position, the test sample 35 can then be ejected from the injection channel 24 and the moulding chamber 25 after opening of the mould 12, i.e. after the mould half 27 is moved away, as shown in FIG. 5. After the test sample mould 12 is reclosed, it is usually reheated by way of the tempering device 33 in order that a repeated injection operation may proceed without interruption. In contrast, the melt extractor 11 is as a rule heated continuously by the tempering device 32 to enable the described operations to proceed without interruption.

The described procedure shows that it can be automated in a very simple manner, i.e. the drives (not shown in the drawing) for the suction and pressure piston 16, the valve body 20, the mould half 27, the ejector 31 and the switches for the tempering device 32, 33 can be simply triggered by way of a freely programmable control system. In order to achieve storage of the test samples in the time sequence of their manufacture, there is arranged below the test sample mould 12 a conveyor 36 by means of which the test samples 35 are fed in the transport direction 37 to a store where they are deposited in chronological order in coded places.

FIG. 6 shows a modified embodiment of the apparatus 10 by means of which the melt can be extracted merely from the central area of the melt channel 8, that is from the central area of melt channel surrounding its concentric longitudinal axis 4 and injected into the test sample moulding chamber 25. Where the parts of this apparatus 10' are identical to the apparatus 10, the same reference numerals are used without a detailed description. Where the parts are functionally identical, but there are slight modifications in design, the same reference numerals are used with a prime. In the case of apparatus 10' there is arranged in the transfer channel 14 an additional extraction pipe 38 inside which the suction/pressure piston 16' is arranged. This extraction pipe 38, which is designed with the thinnest walls possible, can be inserted as far as and into the melt channel 8, as can be seen from FIG. 6. To extract melt from the central area of the melt channel 8, i.e. adjacent to its longitudinal axis 4, this extraction pipe 8 is inserted as far as this point. Extraction then takes place, as already described, by moving the piston 16'. If the piston 16 is in its retracted position corresponding to the view in FIG. 2, the extraction pipe 38 is also retracted as far as and into this position, melt is subsequently sucked in corresponding to the cross-section of the pipe wall, which melt is, however left predominantly in the area between the melt channel 8 and the valve 23 in the transfer channel 14. Then the piston 16' and the extraction pipe 38 are moved together out of a position corresponding to the view in FIG. 3 into a position corresponding to the view in FIG. 4, whereby the melt is injected through the injection channel 24 into the test sample moulding chamber 25. The transfer channel 14 is then moved by joint movement of the extraction pipe 38 together with the piston 16' into a position corresponding to the view in FIG. 1 so that again closure of the transfer channel 14 clear of dead space is achieved. The extraction pipe 38 combines with the piston 16' to form a coaxial double piston. With the extraction pipe 38 and the suction piston area 17' of the piston 16' in the mentioned closing position flush with the inner wall 30 of the pipe 9, the guide bore 29' in the piston 16' is in alignment not only with the guide channel 28 and the injection channel 24, but also with a guide bore 29a in the extraction pipe 38 so that when in this position the ejector 31 can be pushed into the injection channel 24. In this case also, a drive for the extraction pipe 38 can be triggered as part of the described sequence control so that a fully automatic operation is possible.

In the case of the two embodiments according to FIGS. 1 to 5, on the one hand, and FIG. 6, on the other hand, the normal production operation takes place entirely without interruption in the breaks between melt extractions; there are no dead spaces at all in the melt channel 8. During melt extraction there is no contact between the melt channel 8 and the atmosphere. Because the diameter D of the melt channel 8 is clearly greater than the diameter d of the transfer channel 14, no interruption of the melt flow in the conveying direction 7 occurs either during a melt extraction. Also the apparatus 10, 10' themselves are free from dead space and are not in contact with the atmosphere. Even during ejection of the test samples 35, i.e. when the test sample mould 12 is open, firstly the ejector 31 and in addition also the piston 16 or 16' close the connection with the melt channel 8.

Figure 7:
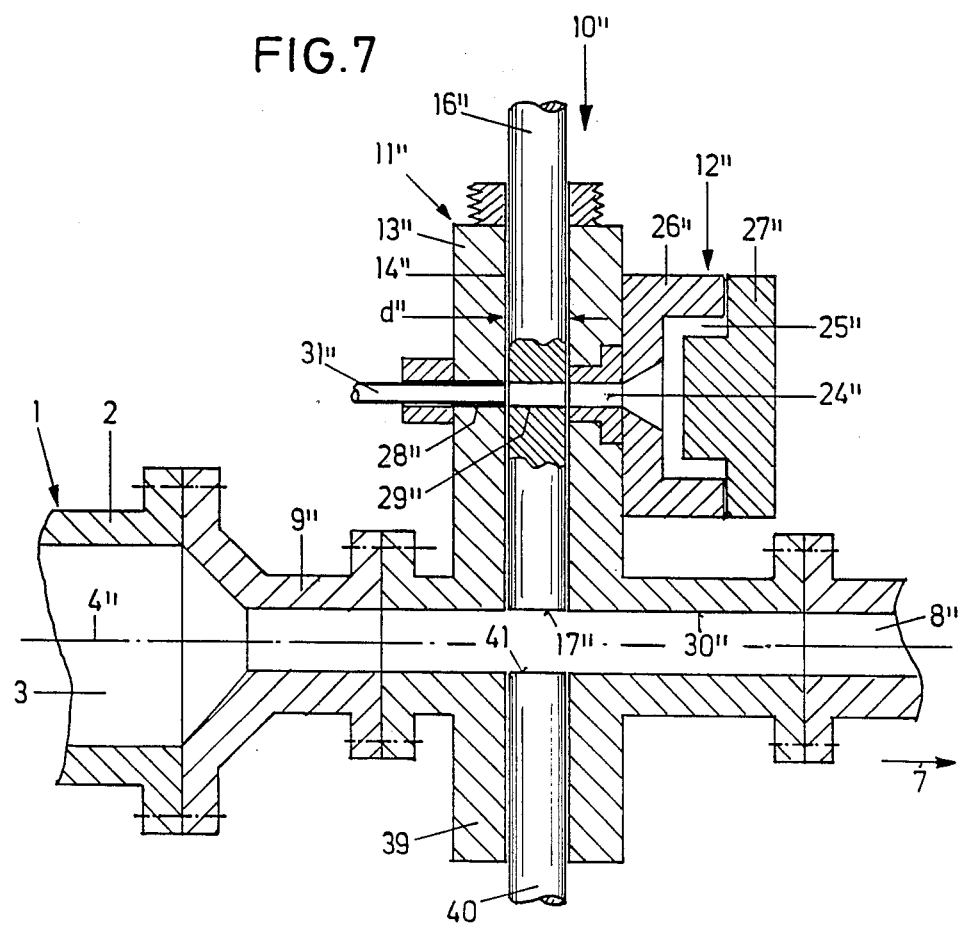

In the embodiment according to FIGS. 7 to 9 certain parts are identical to those in the exemplary embodiment according to FIGS. 1 to 5. In this connection identical reference numerals are used. Many parts are different in design, but identical in function or are largely identical; in this respect the same reference numerals are used with a double prime.

In the extraction housing 13" there is formed a transfer channel 14" in which a piston serving merely as a suction piston 16" is slidably arranged. Lying diametrically opposite the transfer channel 14" on the other side of the melt channel 8", there is arranged a guide housing 39 for a pressure piston 40 which can be moved through the melt channel 8" into the transfer channel 14", this piston then sealing the latter in the direction of the melt channel 8". The diameter of the pressure piston area 41 of the pressure piston 40 is thus identical to the suction piston area 17" of the suction piston 16". Both have approximately a diameter equal to the diameter d" of the transfer channel 14". An ejector 31", which is guided in an ejector guide channel 28", is provided at right angles to the transfer channel 14" and in alignment with the injection channel 24". The piston 16" has a guide bore 29" for the ejector 31". The test sample mould 12", with two mould halves 26", 27" and a test sample moulding chamber 25" enclosed by these mould halves, is identical in function to the test sample mould 12. Where there is no separate description, reference shall be made to the above description concerning the reference numerals with a double prime used in FIGS. 7 to 9. Whilst the apparatus 10 and 10' are flange-mounted on the side of the pipe 9 defining the melt channel 8, the apparatus 10" is fitted in the melt channel 8".

The extraction of a melt sample and the manufacture of a test sample therefrom proceed as follows:

In the starting position the piston 16" lies with its piston area 17" flush with the inner wall 30" of the melt channel 8", corresponding to the view in FIG. 7, so that the melt can be conveyed freely in the conveying direction 7. The ejector 31" is retracted out of the injection channel 24" and the guide bore 29", and is therefore situated only in the ejector guide channel 28". To extract a melt sample the suction piston 16" is firstly retracted, sucking the melt into the transfer channel 14". It is stopped in a retracted position, and no longer closes the injection channel 24" fully, as can be seen from FIG. 8.

The pressure piston 40 is then pushed through the melt channel 8" into the transfer channel 14", the pressure piston area 41 closing the latter in the direction of the melt channel 8". Because the diameter d" of the pressure piston 40 is distinctly smaller than the diameter D" of the melt channel 8", the melt can furthermore flow in the conveying direction 7 through the melt channel 8" mainly without hindrance. From the moment when the pressure piston 40 dips with its pressure piston area 41 into the transfer channel 14", the melt is injected out of the latter through the injection channel 24" into the test sample moulding chamber 25". The movement of the pressure piston 40 is stopped when the moulding chamber 25" is filled. The same reference as defined above for the corresponding distance 1 applies therefore to the distance 1" covered by the pressure piston 40 in the transfer channel 14". The space covered by the pressure piston 40 in the transfer channel 14" can in this respect be defined as the suction chamber 34".

The end position of the suction piston 16" and pressure piston 40 is shown in FIGS. 8 and 9. Then the piston 16" and the pressure piston 40 are moved back into their respective starting positions in which the suction piston area 17" of the suction piston 16", on the one hand, and the pressure piston area 41 of the pressure piston 40 are flush with the corresponding inner wall 30" of the melt channel 8". In this position the guide bore 29" is in alignment with the ejector 31" so that after cooling of the melt in the moulding chamber 25", the test sample mould 12" can be opened and the test sample ejected by means of the ejector 31". The suction piston 16" has thus already closed the injection channel 24" again before the pressure piston 40 restores communication between the transfer channel 14" and melt channel 8". In this case also, no communication can occur therefore through the injection channel 24" when the test sample mould 12" is open. Regarding the possibility of automatization, the same factors as already described above apply.

What is claimed is:

1. Apparatus for the extraction of melt samples from a material which is liquid at an elevated temperature, but solid at ambient temperature, particularly from continuously operating plastics processing plants, comprising:
    a melt channel (8, 8");
    a transfer channel (14, 14") communicating with the melt channel (8, 8");
    an injection channel (24, 24") communicating with the transfer channel (14, 14");
    a test sample mould (12, 12") connected to said injection channel (24, 24");
    a shut-off device operable between a first position in which the transfer channel (14, 14") between the melt channel (8, 8") and the injection channel (24, 24") is open and a second position in which the transfer channel (14, 14") between the melt channel (8, 8") and the injection channel (24, 24") is closed;
    a suction piston (16, 16', 16") which is displaceable from a first position for closing the transfer channel (14, 14") to a second position for opening the injection channel (24, 24") and for withdrawing the melt from the melt channel (8, 8") to the transfer channel (14, 14") in the first position of the shut-off device;
    and a pressure piston (16, 16', 40) for injecting the melt into the test sample mould from the transfer channel (14, 14") in the second position of the shut-off device.

2. Apparatus according to claim 1 wherein the suction piston and the pressure piston are formed as one piece of a suction-pressure piston (16, 16') and wherein the shut-off device is independent from the suction-pressure piston (16, 16').

3. Apparatus according to claim 1, wherein the shut-off device is formed by the pressure piston (40) which can be introduced into the transfer channel (14") from the melt channel (8").

4. Apparatus according to claim 1, wherein the suction piston (16') is in the form of a double plunger having an extraction pipe (38) which surrounds the suction piston (16') and can be introduced into the melt channel (8).

5. Apparatus according to claim 1, wherein there is provided an ejector (31, 31") which can be introduced into the injection channel (24, 24") from the transfer channel (14, 14").

6. Apparatus according to claim 3, wherein the pressure piston (40) is arranged diametrically in relation to the transfer channel (14") and can be introduced into the transfer channel (14") through the melt channel (8").

7. Apparatus according to claim 6, wherein, when in a position introduced into the transfer channel (14"), the pressure piston (40) only partially closes the melt channel (8").

8. Apparatus according to claim 1, wherein the suction piston (16, 16', 16") has a guide bore (29, 29', 29") for an ejector (31, 31"), which guide bore is in alignment with the ejector (31, 31") if the suction piston (16, 16', 16") closes the melt channel (8, 8") from the transfer channel (14, 14").

9. Apparatus according to claim 8, wherein the suction piston (16') is in the form of a double plunger having an extraction pipe (38) which surrounds the suction piston (16') and can be introduced into the melt channel and wherein there is provided in the extraction pipe (38) a guide bore (29a) for the ejector (31), which guide bore is in alignment with the guide bore (29') in the suction piston (16') if it is flush with the inner wall (30) of the suction channel (8).

10. Apparatus for the extraction of melt samples from a material which is liquid at an elevated temperature, but solid at ambient temperature, particularly from continuously operating plastics processing plants, comprising:
    a melt channel (8, 8")
    a transfer channel (14, 14") communicating with the melt channel (8, 8");
    an injection channel (24, 24") communicating with the transfer channel (14, 14");
    a test sample mould (12, 12") connected to said injection channel (24, 24");
    a shut-off device operable between a first position in which the transfer channel (14, 14") between the melt channel (8, 8") and the injection channel (24, 24") is open and a second position in which the transfer channel (14, 14") between the melt channel (8, 8") and the injection channel (24, 24") is closed;
    a suction piston (16, 16', 16") which is displaceable from a first position for closing the transfer channel (14, 14") to a second position for opening the injection channel (24, 24") and for withdrawing the melt from the melt channel (8, 8") to the transfer channel (14, 14") in the first position of the shut-off device and which can be moved into a position flush with an inner wall (30, 30") of the melt channel (8, 8");

and a pressure piston (16, 16', 40) for injecting the melt into the test sample mould from the transfer channel (14, 14") in the second position of the shut-off device.

11. Apparatus according to claim 10, wherein the shut-off device is formed by the pressure piston (40) which can be introduced into the transfer channel (14") from the melt channel (8").

12. Apparatus according to claim 10, wherein the suction piston (16') is in the form of a double plunger having an extraction pipe (38) which surrounds the suction piston (16') and can be introduced into the melt channel (8).

13. Apparatus according to claim 10, wherein there is provided an ejector (31, 31") which can be introduced into the injection channel (24, 24") from the transfer channel (14, 14").

14. Apparatus according to claim 11, wherein the pressure piston (40) is arranged diametrically in relation to the transfer channel (14") and can be introduced into the transfer channel (14") through the melt channel (8").

15. Apparatus according to claim 14, wherein, when in a position introduced into the transfer channel (14"), the pressure piston (40) only partially closes the melt channel (8").

16. Apparatus according to claim 10, wherein the suction piston (16, 16', 16") has a guide bore (29, 29', 29") for an ejector (31, 31"), which guide bore is in alignment with the ejector (31, 31") if the suction piston (16, 16', 16") closes the melt channel (8, 8") from the transfer channel (14, 14").

17. Apparatus according to claim 16, wherein the suction piston (16') is in the form of a double plunger having an extraction pipe (38) which surrounds the suction piston (16') and can be introduced into the melt channel and wherein there is provided in the extraction pipe (38) a guide bore (29a) for the ejector (31), which guide bore is in wall (30) of the suction channel (8).

* * * * *